Aug. 23, 1960      F. E. WINDOVER      2,950,199
FROZEN CONFECTION AND METHOD OF MAKING THE SAME
Filed March 30, 1956
Frozen confection comprising flavored and colored aqueous sugar solution containing thickener and binder material
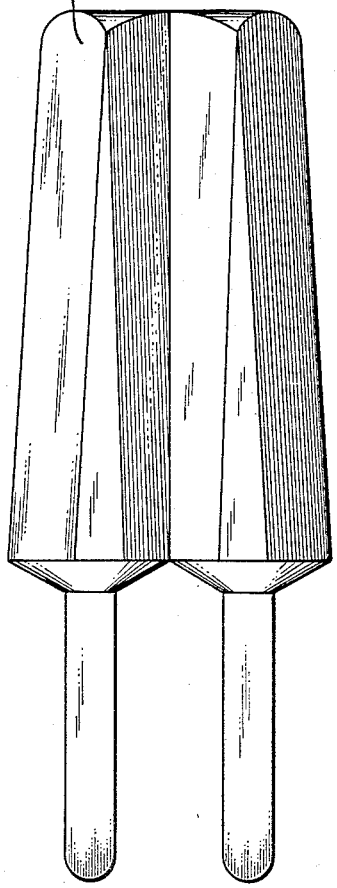
INVENTOR.
Francis E. Windover
BY
*Griswold & Burdick*
ATTORNEYS

2,950,199
FROZEN CONFECTION AND METHOD OF MAKING THE SAME

Francis E. Windover, Midland, Mich., assignor to The Dow Chemical Company, Midland, Mich., a corporation of Delaware Filed Mar. 30, 1956, Ser. No. 575,150

9 Claims. (Cl. 99—136)

This invention relates to an ice confection or novelty refreshment of the type that ordinarily consists of colored and flavored aqueous solutions which usually are sweetened with sugar, prepared, dispensed and intended for consumption in a solid frozen condition, frequently in the form of elongate lollipops or the like which are supported on a stick about which the solution or composition is frozen. More particularly, this invention relates to a method for the preparation of such a frozen confection so as to have generally improved characteristics including, especially, a minimized tendency to drip profusely during consumption. It also relates to the improved frozen confections that may thereby be obtained.

Frozen confections of the indicated variety enjoy a widespread popularity. They are particularly favored and esteemed by children as a hot weather refreshment. The conventionally available confections of this nature, however, tend to melt and drip at an alarmingly rapid rate during their consumption. This, of course, is an undesirable feature since it may cause staining of hands and clothing due to the coloring matter in the melted saccharine solution and, in many instances, may attract certain loathsome insects such as flies and the like, thereby providing unsanitary and repugnant consequences. In addition, the conventionally available frozen confections of the indicated type frequently are susceptible during melting to be readily drained of the coloring and flavoring matter that is incorporated in the aqueous composition which is used for their preparation. As a result, the consumer may frequently be left with an insipid mass of essentially tasteless and colorless and sometimes slushy ice before being able to completely devour the frozen confection.

It would be desirable to minimize such objectionable features in ice confections of the indicated type. Therefore, it is among the principal objects of the present invention to provide frozen confections of the above-identified variety that have minimized drip rates upon melting and that are better adapted for retaining coloring and flavoring matter in the composition during melting.

This may be accomplished in accordance with the present invention by incorporating in the aqueous composition which is employed in the preparation of a frozen confection of the indicated variety a minor proportion of a thickener and binder material consisting of certain water soluble cellulose ethers. Beneficially, between about 0.1 and 5 percent by weight of the thickener and binder material and, more advantageously, between about 0.5 and 2 percent, may be employed in the composition of the frozen confection, based on the weight of the composition. In many instances, about 0.5 percent by weight of a water soluble cellulose ether may be an optimum amount for employment in a composition. Usually, the upper concentration of the thickener and binder material that may be used suitably is determined by the effect of the thickness that is developed in the composition upon the taste or esculent appeal of the frozen confection.

Frozen confections in accordance with the invention, one of which is illustrated in the accompanying drawing, have a greatly minimized tendency to drip upon melting and retain better through-distribution of flavor and color in the composition during melting than conventional frozen confections of the indicated type.

Advantageously, a water soluble cellulose ether of the type having between about 1.5 and 2.0 methoxy groups per each recurring $C_6$ unit in the cellulose molecule may be employed as a thickener and binder material in the practice of the invention. Water soluble cellulose ethers having both hydroxypropyl groups and methoxy groups as etherifying substituents may also be beneficially utilized. Generally, the higher viscosity types of cellulose ethers may be utilized with advantage, such as those whose 2 percent aqueous solutions at 20° C. have viscosities in the neighborhood of 4,000 centipoises.

The thickener and binder material may be utilized in the form of a prepared water solution in formulating the compositions containing coloring, flavoring and a sweetener, usually sugar, to be frozen into a confection. In many instances, however, the solid ingredients, including sugar and the thickener and binder material, may be provided in dry blended form for subsequent dissolution in water at any temperature that may be required for the purpose. The resulting compositions may then be chilled and frozen to provide the ice confection.

In order to further illustrate the invention but without being restricted thereto, the following example is given:

EXAMPLE

Several compositions for frozen confections were prepared using, in each case, one package of the size normally available for retail distribution of a commercially available flavoring and coloring ingredient for non-alcoholic liquid refreshment, frozen confections and the like, about ⅔ cup of sugar and about 1 quart of water. Excepting for a control sample which consisted only of the flavored and colored sugar solution in the manner of conventionally available frozen confections of the herein indicated variety, each composition had a minor proportion of thickener and binder material incorporated therein in accordance with the invention. Each of the Table.—Drip rates of various frozen confections

| Run | Thickener in Composition | Percentage By Weight of Thickener | Time for 1st drop, minutes | Drip Volume after 20 minutes, milliliters | Time Required for 5 milliliter Drip Volume, min. |
|---|---|---|---|---|---|
| 1 | None (control) | | 8 | 3.25 | 24 |
| 2 | Starch (clear-gel) | 2 | 17 | 0.75 | 31 |
| 3 | ____do____ | 4 | 20 | 1 drop | 35 |
| 4 | Gum Arabic | 2 | 11 | 1.5 | 28 |
| 5 | ____do____ | 5 | 17 | | 28 |
| 6 | Carboxymethyl cellulose (high viscosity type) | 1 | 16 | 1.75 | 30 |
| 7 | Hydroxypropyl methyl cellulose (4,000 centipoise). | 1 | 17 | 0.25 | 31 |
| 8 | ____do____ | 0.5 | 15 | 1.75 | 30 |
| 9 | Methyl Cellulose (4,000 centipoise) | 1 | 18 | 0.75 | 35 | compositions were frozen on wooden paddle-shaped sticks in suitable plastic molds to form ice confections having dimensions of about 1 x 1 x 2 inches. These were tested to determine their drip rates by measuring the time which was required at about 24° C. and 50 percent relative humidity for the first drop to form on the frozen confection, and then observing the length of time that was required for five milliliters of the composition to melt and drip therefrom. The amount that had dripped off each frozen confection after a 20 minute period was also noted. The results are given in the following tabulation, which also includes the results that were obtained with the unthickened frozen confection for purposes of comparison. The compositions containing the cellulose ethers were prepared by adding the cellulose ether to the colored and flavored sugar solution at about 90° C., then cooling it to 10° C. before freezing. The starch-containing compositions were obtained by cooking the starch solution at 85° C. for about 15 minutes before freezing. The remainder of the frozen confection compositions were prepared by mixing the ingredients at room temperature and freezing.

In addition, all of the thickener and binder materials tended to retain the flavor and color of the composition in a better, non-draining dispersion throughout the frozen confections in which they were incorporated in comparison to that which was experienced in the unthickened control sample. Furthermore, none of the thickener and binder materials imparted an adverse taste or other deleterious characteristics to the frozen confection compositions in which they were used. As is apparent, the frozen confections in accordance with the present invention took about twice as long to produce the first drop as did the unthickened control sample. Such an additional dripless time period would ordinarily permit a consumer to completely devour the confection before there would be an appreciable occurrence of dripping.

What is claimed is:

1. Method for the preparation of frozen confections of the type that is manufactured by freezing, in a mold form, a composition consisting essentially of a colored and flavored aqueous sugar solution in order to obtain an article having a minimized propensity for dripping which comprises incorporating in said composition prior to its freezing a minor proportion of a thickener and binder material selected from the group of water soluble cellulose ethers consisting of methyl cellulose and hydroxypropyl methyl cellulose.

2. The method of claim 1 wherein between about 0.1 and 5.0 percent by weight of the thickener and binder material is incorporated in the composition, based on the weight of the composition.

3. The method of claim 1 wherein between about 0.5 and 2 percent by weight of the thickener and binder material is incorporated in the composition, based on the weight of the composition.

4. The method of claim 1 wherein the thickener and binder material is hydroxypropyl methyl cellulose.

5. The method of claim 1 wherein the thickener and binder material is methyl cellulose.

6. A frozen confection characterized in having a minimized tendency to drip which comprises a colored and flavored aqueous sugar solution in which there is incorporated between about 0.1 and 5.0 percent by weight, based on the weight of the solution, of a thickener and binder material selected from the group of water soluble cellulose ethers consisting of methyl cellulose and hydroxypropyl methyl cellulose.

7. The frozen confection of claim 6 wherein the thickener and binder material is methyl cellulose in an amount between about 0.5 and 2.0 percent by weight.

8. The frozen confection of claim 6 wherein the thickener and binder material is hydroxypropyl methyl cellulose in an amount between about 0.5 and 2.0 percent by weight.

9. The frozen confection of claim 6 wherein the thickener and binder material is hydroxypropyl methyl cellulose in the amount of about 0.5 percent by weight.

References Cited in the file of this patent

UNITED STATES PATENTS

| | | |
|---|---|---|
| 1,440,011 | Hosman | Dec. 26, 1922 |
| 1,878,203 | Turnbow | Sept. 20, 1932 |
| 2,423,600 | Landers | July 8, 1947 |

OTHER REFERENCES

Effects of Binders Upon the Melting and Hardness of Ice Cream, by Holdaway et al., Virginia Polytechnic Institute, Virginia Agricultural Experiment Station, Blacksburg, Va., Bulletin 211, June 1916, pp. 3–7.

Water-Soluble Cellulose Ethers, by Bock, Industrial & Engineering Chemistry, vol. 29, No. 9, September 1937, pp. 985–987.

A Comparison of Some Ice Cream Stabilizers by Josephson et al., Southern Dairy Products Journal, April 1943, vol. 13, page 103.

A New Cellulose Gum Stabilizer for Ice Cream, by Josephson et al., The Ice Cream Review, June 1945, pp. 32, 76, 78 and 80.